(12) United States Patent
Bahr et al.

(10) Patent No.: US 7,745,561 B2
(45) Date of Patent: Jun. 29, 2010

(54) PROCESSES FOR MAKING COPOLYMERS USING MACROCYCLIC OLIGOESTERS, AND COPOLYMERS THEREFROM

(75) Inventors: Steven R. Bahr, Schenectady, NY (US); James Pawlson, Averill Park, NY (US)

(73) Assignee: Cyclics Corporation, Schenectady, NY (US)

( * ) Notice: Subject to any disclaimer, the term of this patent is extended or adjusted under 35 U.S.C. 154(b) by 561 days.

(21) Appl. No.: 11/345,057

(22) Filed: Jan. 31, 2006

(65) Prior Publication Data
US 2010/0120957 A1 May 13, 2010

(51) Int. Cl.
C08G 63/00 (2006.01)
C08G 63/02 (2006.01)

(52) U.S. Cl. .................... 528/272; 264/176.1; 264/219; 525/272; 525/274; 526/271; 526/272; 526/297; 526/298

(58) Field of Classification Search ............... 264/176.1, 264/219; 525/272, 274; 528/297, 298, 271, 528/272
See application file for complete search history.

(56) References Cited

U.S. PATENT DOCUMENTS

| | | | |
|---|---|---|---|
| 4,680,345 | A | 7/1987 | Kobayashi et al. |
| 4,785,060 | A | 11/1988 | Nagler |
| 5,039,717 | A | 8/1991 | Kawakami et al. |
| 5,386,037 | A | 1/1995 | Takekoshi et al. |
| 5,648,454 | A | 7/1997 | Brunelle |
| 5,656,700 | A | 8/1997 | Kägi et al. |
| 5,661,214 | A | 8/1997 | Brunelle et al. |
| 6,297,330 | B1 | 10/2001 | Burch, Jr. et al. |
| 6,420,048 | B1 | 7/2002 | Wang |
| 6,436,549 | B1 | 8/2002 | Wang |

2004/0155380 A1 * 8/2004 Kendall et al. ............... 264/257

FOREIGN PATENT DOCUMENTS

| | | |
|---|---|---|
| EP | 1 354 908 A1 | 10/2003 |
| EP | 1 378 540 A1 | 1/2004 |
| JP | 4253764 | 9/1992 |
| JP | 2003011210 | 1/2003 |
| WO | WO 95/00574 | 1/1995 |
| WO | WO 01/53379 | 7/2001 |
| WO | WO 2004/060640 | 7/2004 |

OTHER PUBLICATIONS

Brunelle (1995) "Macrocycles for the Synthesis of High Molecular Weight Polymers" pp. 197-235, ch. 6, New Methods of Polymer Syntheses: vol. 2, edited by J.R. Ebdon and G.C. Eastmond.
International Search Report, International Application No. PCT/US02/20956, issued Mar. 17, 2003.
International Preliminary Examination Report, International Application No. PCT/US02/17607, issued Aug. 29, 2003.
International Search Report and Written Opinion, International Application No. PCT/US02/17607, issued Oct. 29, 2002.
International Search Report and Written Opinion, International Application No. PCT/US2007/002534, issued Jul. 30, 2007.

* cited by examiner

Primary Examiner—Terressa M Boykin
(74) Attorney, Agent, or Firm—Goodwin Procter LLP

(57) ABSTRACT

The invention provides alternatives to traditional polycondensation processes for preparing copolymers. For example, in certain embodiments, the invention provides a process that includes an extrusion step and a solid state polymerization step to prepare high molecular weight block copolymer with a "hard block" contributed by a macrocyclic polyester oligomer (MPO) and a "soft block" contributed by a dihydroxyl-functionalized polymer, an oligoether, and/or a dimerized fatty acid (i.e. a polyol). The invention also provides new copolymer compositions made possible by the new processes—for example, copolymers of higher molecular weight, copolymers with higher weight ratio of soft block units to hard block units, copolymers made with higher molecular weight polyol, and copolymers with hard block units that are themselves random copolyesters of units contributed by a MPO and a cyclic ester.

49 Claims, No Drawings

PROCESSES FOR MAKING COPOLYMERS USING MACROCYCLIC OLIGOESTERS, AND COPOLYMERS THEREFROM

FIELD OF THE INVENTION

This invention relates generally to thermoplastics and articles formed therefrom. More particularly, in certain embodiments, the invention relates to processes for preparing copolymers from macrocyclic polyester oligomers (macrocyclic oligoesters, MPOs), as well as the copolymers produced therefrom.

BACKGROUND OF THE INVENTION

Macrocyclic polyester oligomers (macrocyclic oligoesters, MPOs) have unique physical properties that facilitate the manufacture of polyester products. MPOs demonstrate certain processing advantages of thermosets, yet can be polymerized to form thermoplastic polyesters which provide superior toughness, excellent chemical resistance, high heat resistance, and are thermoformable, paintable, bondable, weldable, and recyclable. For example, MPO resins are available as easy-to-handle solid pellets that melt into a low viscosity fluid when heated. The low melt viscosity allows the MPO resin to easily fill molds or permeate fabrics to make prepregs. Furthermore, certain MPOs melt and polymerize at temperatures well below the melting point of the resulting polymer. Upon melting and in the presence of an appropriate catalyst, polymerization and crystallization can occur virtually isothermally, without significant heat generation and without production of volatile organic compounds (VOCs) or other harmful emissions. The polymerized product can be released without cooling the mold, and the time and expense required to thermally cycle a tool is favorably reduced.

MPO can be polymerized to form a thermoplastic polyester via ring-opening polymerization at elevated temperature in the presence of an appropriate catalyst. A block copolymer having a "hard block" and a "soft block" can be formed, for example, by reacting an MPO such as cyclic poly(butylene terephthalate) (cPBT) with a dihydroxyl-functionalized polymer in a polycondensation process, as described in co-owned U.S. Pat. No. 6,436,549 by Wang, the text of which is incorporated by reference herein in its entirety. Such block copolymers are useful, for example, in the manufacture of automotive body panels and chassis components, as well as aircraft wing skins.

However, commercial manufacture of block copolymer via polycondensation requires high capital investment in polycondensation reactors and associated process equipment. Most polycondensation systems are designed for high volume production of a single product, making it difficult to adapt such systems for low volume production, or for production of multiple products with fast changeover.

Furthermore, the manufacture of block copolymer via polycondensation can result in copolymer of insufficient molecular weight, particularly when using high loading levels of soft block reactant, such as dihydroxyl-functionalized polymer. This is likely due to the high concentration of species that act as chain stoppers in the polymerization reaction. Copolymers of higher molecular weight are desired because of their advantageous physical properties. For example, higher molecular weight copolymers generally exhibit increased strength. They also exhibit higher intrinsic viscosities and higher melt strength, and are therefore capable of being processed less expensively.

Moreover, the types and molecular weights of soft block reactants that can be used to produce block copolymers in polycondensation processes is limited due to miscibility problems. The soft block reactant (i.e. a polyol) must typically have molecular weight ($M_w$) less than 1000 g/mol to inhibit phase separation during the polymerization reaction. Most commercially-available dihydroxyl functionalized polymers have molecular weight below 1000 g/mol for this reason. Also, the weight percentage of the "soft block" component in the block copolymer must typically be kept low in order to sufficiently build up overall molecular weight of the block copolymer. However, this results in a block copolymer with overly-long hard block units. Moreover, highly polar hydroxyl-functionalized polymers are generally unusable in traditional polycondensation processes due to the increased miscibility problems they cause.

There is a need for methods of producing block copolymers whose structures and compositions can be better customized for a wider range of uses. For example, there is a need for manufacturing methods that produce block copolymers with desired physical and chemical properties such as chemical resistance, heat resistance, and high melting temperature (i.e. provided by the hard block), as well as toughness, hysteresis, and low modulus (i.e. provided by the soft block). In particular, methods are needed for manufacturing block copolymers with higher overall soft block content, as well as block copolymers with more highly polar soft blocks. Traditional polycondensation processes are limited in the type and amount of soft block component that can be incorporated into a block copolymer.

Furthermore, traditional polycondensation processes require high capital investment and are generally only designed for making one particular product in large quantities. Thus, there is also a need for block copolymer production methods that require lower capital investment, that can be adapted for high yields on small volume runs, and that allow for fast product changeover.

SUMMARY OF THE INVENTION

Block copolymers are made by reacting a macrocyclic polyester oligomer (MPO) (a "hard block" component) with a "soft block" component such as a dihydroxyl-functionalized polymer, an oligoether, and/or a dimerized fatty acid at elevated temperature in a high shear environment, for example, in an extruder or other mixing apparatus.

The use of high shear enables the incorporation of larger amounts of the soft block component into the block copolymer and allows the use of more highly polar soft block components and/or higher molecular weight soft block components than would be possible in traditional polycondensation methods. Miscibility problems associated with polycondensation methods are overcome by keeping components sufficiently dispersed during initial polymerization, for example, using an extruder. The unique physical properties of MPOs facilitate the use of an extruder (or other shear-producing apparatus) as a reaction vessel.

The molecular weight of the copolymer product can then be increased after extrusion by heating the product under vacuum, for example, using solid state polymerization equipment. This results in a high molecular weight copolymer product whose structure and composition can be customized to provide a desired combination of physical and/or chemical properties.

Manufacture of block copolymer via extrusion and solid state polymerization can be accomplished without polycondensation reactors or other associated equipment, thereby reducing the capital investment needed for commercial production of the block copolymer. The block copolymers can be manufactured in continuous, semi-continuous, or batch processes using existing extruders and solid-state polymerization equipment. Manufacturing flexibility and productivity are also improved through faster product changeovers and higher yields on small volume production runs.

Thus, in one aspect, the invention relates to a method of making a block copolymer, the method including the steps of: (a) processing a mixture including (i) a macrocyclic oligoester, (ii) a dihydroxyl-functionalized polymer, an oligoether, and/or a dimerized fatty acid, and (iii) a catalyst, thereby forming a block copolymer; and (b) increasing the molecular weight of the block copolymer by heating at a temperature above 80° C. under vacuum. Step (a) can be performed, for example, using one or more extruders (i.e. single-screw and/or twin-screw), mixers, blenders, and/or other devices capable of producing high shear, although in certain alternative embodiments high shear is not necessary. In certain embodiments, step (a) is performed, for example, using one or more internal mixers, pultruders, mixing mills, tilt body dispersion mixers, kneaders, and/or other suitable processing equipment. In some embodiments, a combination of one or more extruders and/or other processing equipment is used. In certain embodiments, the device(s) used in step (a) perform both distributive and dispersive mixing. Step (b) can be performed, for example, using solid-state polymerization equipment. In preferred embodiments, the macrocyclic oligoester contributes to a hard block of the block copolymer, and component (ii) (i.e. the dihydroxyl-functionalized polymer, oligoether, and/or dimerized fatty acid) contributes to a soft block of the block copolymer.

In preferred embodiments, the macrocyclic oligoester has a structural repeat unit of Formula I:

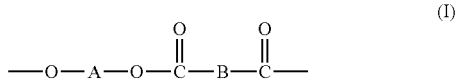

(I)

where A is an alkylene, a cycloalkylene, or a mono- or polyoxyalkylene group; and B is a divalent aromatic or alicyclic group.

The method allows the use of a soft-block component of higher molecular weight than would be possible via traditional polycondensation processes. For example, the mixture in step (a) (i.e. the extrusion step) may include a dihydroxyl-functionalized polymer having molecular weight (i.e. number average molecular weight) greater than 1000 g/mol, greater than 2000 g/mol, greater than 2500 g/mol, greater than 5000 g/mol, greater than 7500 g/mol, greater than 10,000 g/mol, greater than 15,000 g/mol, greater than 20,000 g/mol, or greater than 25,000 g/mol, or more.

The method allows the incorporation of a higher proportion of soft block components to hard block components in the resulting block copolymer. For example, in one embodiment, the weight ratio of all block units contributed by component (ii) to all block units contributed by component (i) in the block copolymer is at least about 10:90. In other embodiments, this ratio is at least about 15:85, at least about 20:80, at least about 25:75, at least about 30:70, at least about 35:65, at least about 40:60, at least about 45:55, or at least about 50:50. In preferred embodiments, the amounts of component (i) and component (ii) that are charged into process equipment (i.e. an extruder) in step (a) are about the same as the amounts of component (i) and component (ii) that are incorporated into the resulting block copolymer, although this is not necessary. In certain embodiments, step (a) includes charging an extruder with at least a 25:75 weight ratio of component (ii) to component (i). In other embodiments, this ratio is at least about 15:85, at least about 20:80, at least about 25:75, at least about 30:70, at least about 35:65, at least about 40:60, at least about 45:55, or at least about 50:50. In certain embodiments, the weight ratio of the soft block to the hard block in the block copolymer is selected to provide one or more desired physical, chemical, and/or mechanical properties. For example, the weight ratio of the soft block to the hard block may be selected to provide a particular combination of physical, chemical, and/or mechanical properties.

Likewise, the type of soft block component used may be chosen to provide the copolymer with a given property. For example, highly polar hydroxyl-functionalized polymers—for example, glycols such as polyethylene glycol—may be used to make the resulting block copolymer an inherently dissipative polymer (IDP). IDPs can be used, for example, in blends with commercial polymer(s) to provide antistatic properties. IDPs can be blended with any of a number of commercial polymers—for example, ABS, polycarbonate, polystyrene, and polyolefins—with a minimal effect on other properties. IDPs offer advantages over antistatic agents; for example, IDPs do not leach out of the host polymer as do antistats, and the performance of IDPs are not as highly dependent on atmospheric humidity when compared to antistats.

In preferred embodiments, the catalyst is a transesterification catalyst. The catalyst may include, for example, a tin compound and/or a titanate compound.

In one embodiment, step (b) is performed to increase the molecular weight of the block copolymer following extrusion in step (a) by exposing the extrudate to heat under vacuum. For example, in certain embodiments, step (b) includes heating the block copolymer to increase its molecular weight following step (a) by a factor of at least about 2, at least about 3, at least about 4, at least about 5, at least about 6, at least about 7, at least about 8, at least about 9, or at least about 10. Following step (b), in certain embodiments, the block copolymer has molecular weight (i.e. weight average molecular weight relative to GPC polystyrene standards) of at least about 30,000, at least about 50,000, at least about 100,000, at least about 125,000, at least about 150,000, at least about 175,000, at least about 200,000, at least about 225,000, at least about 250,000, at least about 275,000, or at least about 300,000.

The term "under vacuum" as used herein means at a pressure below atmospheric pressure. In certain embodiments, step (b) involves heating at a pressure no greater than about 100 torr, no greater than about 20 torr, preferably no greater than about 5 torr, and more preferably no greater than about 0.5 torr. Heating in step (b) may occur, for example, at a temperature of at least about 100° C., at least about 150° C., at least about 175° C., at least about 190° C., or at least about 200° C. In preferred embodiments, heating in step (b) takes place at a temperature from about 180° C. to about 250° C., from about 190° C. to about 240° C., or from about 200° C. to about 220° C. Heating in step (b) preferably takes place where the block copolymer is in a solid state. In certain embodiments, step (b) involves heating the block copolymer for a period of time from about 2 hours to about 16 hours, or from about 4 hours to about 8 hours. The time of heating, temperature of heating, and/or pressure may be varied depending on the block copolymer, the equipment used, and/or the increase in molecular weight desired.

In certain embodiments, the macrocyclic oligoester includes at least one monomeric unit that is an alkylene terephthalate, for example, butylene terephthalate, ethylene terephthalate, and/or propylene terephthalate.

In certain embodiments where component (ii) includes a dihydroxyl-functionalized polymer, the dihydroxyl-functionalized polymer includes a dihydroxyl-functionalized poly(alkylene terephthalate), for example, dihydroxyl-functionalized poly(ethylene terephthalate), poly(butylene terephthalate), and/or polypropylene terephthalate). In certain embodiments, the dihydroxyl-functionalized polymer includes a dimer diol, a polyolefin diol, a polycaprolactone diol, a polyperfluoroether diol, and/or a polysiloxane diol.

In certain embodiments where component (ii) includes an oligoether, the oligoether includes poly(ethylene ether) glycol, poly(propylene ether) glycol, poly(tetramethylene ether) glycol, and/or poly(tetramethylene oxide).

In certain embodiments where component (ii) includes a dimerized fatty acid, the dimerized fatty acid includes a dimerization product of oleic acid, linoleic acid, palmitoleic acid, elaidic acid, eucric acid, sunflower oil, soybean oil, olive oil, rapeseed oil, cottonseed oil, and tall oil.

Because of the improved versatility provided by various embodiments of the invention, it is possible to produce novel block copolymers with unique properties that would otherwise be impossible to make. For example, it is possible to adjust the melting point and crystallinity of the hard block portion of the copolymer by reacting the block copolymer with an ester other than MPO (i.e. a cyclic ester such as caprolactone, or polycaprolactone) in the presence of a transesterification catalyst. The result is a hard block portion of the copolymer that contains a random configuration of units contributed by the MPO and units contributed by the ester. The altered composition may affect overall miscibility and microphase separation characteristics of the hard block and soft block portions of the copolymer, thereby changing the physical, mechanical, and/or chemical properties of the copolymer.

Therefore, in certain embodiments, the method further includes the step: (c) contacting the block copolymer after step (b) with an ester in the presence of a transesterification catalyst at an elevated temperature, thereby producing a copolyester including structural units from component (i), component (ii), and the ester, where the ester includes at least one structural unit of Formula II:

—$R_1$—O—C(O)—$R_2$— (II)

where each of $R_1$ and $R_2$ is independently a divalent organic moiety. In certain embodiments, the block copolymer has a soft block including units contributed by component (ii) and the block copolymer has a hard block including units contributed by component (i) and the ester of step (c). In certain embodiments, the hard block includes randomized units contributed by component (i) and the ester of step (c). In preferred embodiments, the ester does not include the same species as the MPO, that is, $R_1$ is not —O-A'- if $R_2$ is —B'—C(O)—, where A' is an alkylene, a cycloalkylene, or a mono- or polyoxyalkylene group and B' is a divalent aromatic or alicyclic group.

In certain embodiments, the ester of step (c) is a cyclic ester, for example, a lactone. The lactone may be, for example, caprolactone. In certain embodiments, the ester includes an aliphatic polyester and/or an aromatic polyester. Step (c) may be conducted, for example, at typical transesterification reaction conditions, for example, at a temperature within a range from about 100° C. to about 300° C., and preferably within a range from about 180° C. to about 250° C.

In another aspect, the invention provides a block copolymer including: (a) a first block unit comprising, within its polymeric backbone, at least one structural unit of Formula I:

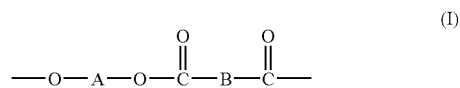

where A is an alkylene, or a cycloalkylene or a mono- or polyoxyalkylene group, and B is a divalent aromatic or alicyclic group; and at least one structural unit of Formula II:

—$R_1$—O—C(O)—$R_2$— (II)

where each of $R_1$ and $R_2$ is independently a divalent organic moiety; and (b) a second block unit comprising, within its polymeric backbone, at least one structural unit of Formula III:

-D- (III)

where D is an alkylene, or a cycloalkylene or a mono- or polyoxyalkylene group, and where one or more of the carbon atoms in D may be replaced with an oxygen atom, a nitrogen atom, or a sulfur atom. In certain embodiments, the first block unit of the block copolymer includes a random configuration of the structural units of Formulas I and II. The block copolymer may be manufactured, for example, via methods described herein. In certain embodiments, D includes a polyalkylene ether, a polyethylene ether, a polypropylene ether, a polymethylene ether, a polyolefin, a polycaprolactone, a polyperfluoroether, a dimer diol, and/or a polysiloxane diol. In preferred embodiments, $R_1$ is not —O-A'- if $R_2$ is —B'—C(O)—, where A' is an alkylene, a cycloalkylene, or a mono- or polyoxyalkylene group and B' is a divalent aromatic or alicyclic group.

In certain embodiments, the block copolymer has molecular weight (i.e. weight average molecular weight relative to GPC polystyrene standards) of at least about 30,000, at least about 50,000, at least about 100,000, at least about 125,000, at least about 150,000, at least about 175,000, at least about 200,000, at least about 225,000, at least about 250,000, at least about 275,000, or at least about 300,000.

In one embodiment, the weight ratio of all second block units to all first block units is at least about 10:90. In other embodiments, this ratio is at least about 15:85, at least about 20:80, at least about 25:75, at least about 30:70, at least about 35:65, at least about 40:60, at least about 45:55, or at least about 50:50. In certain embodiments, the block copolymer is inherently dissipative. For example, the weight ratio of all second block units to all first block units may be selected high enough such that the block copolymer is an inherently dissipative polymer (IDP).

In yet another aspect, the invention provides a blend including: (a) a block copolymer with (i) a first block unit including, within its polymeric backbone, at least one structural unit of Formula I:

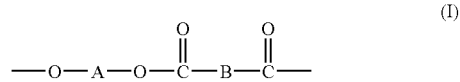

where A is an alkylene, or a cycloalkylene or a mono- or polyoxyalkylene group, and B is a divalent aromatic or alicyclic group, and (ii) a second block unit including, within its polymeric backbone, at least one structural unit of Formula III:

$$-D-\qquad\qquad(III)$$

where D is an alkylene, or a cycloalkylene or a mono- or polyoxyalkylene group, and where one or more of the carbon atoms in D may be replaced with an oxygen atom, a nitrogen atom, or a sulfur atom; and (b) at least one of a hydroxyl-functionalized polymer, an oligoether, and a dimerized fatty acid. In one embodiment, component (b) of the blend includes polyethylene glycol.

DETAILED DESCRIPTION

A block copolymer is prepared by extruding (or otherwise shearing together) a macrocyclic oligoester (MPO) and a dihydroxyl-functionalized polymer (and/or an oligoether, a dimerized fatty acid, and/or other soft block component(s) of the block copolymer) in the presence of a transesterification catalyst. The molecular weight of the resulting block copolymer is increased by heating the solid extrudate under vacuum (at a pressure below atmospheric pressure).

Application of shear in the extruder keeps the soft block component dispersed with the MPO during the initial polymerization step. Miscibility problems associated with traditional polycondensation processes are overcome, and the method enables the use of a wider variety of soft block components, including those of higher molecular weight and/or higher polarity. The use of an extruder results in block copolymer whose molecular weight can be increased through solid-state polymerization.

In certain embodiments, the invention offers advantages over traditional processes that use polycondensation reactors to produce block copolymers. For example, it is possible to produce higher molecular weight block copolymers with higher loading levels of dihydroxyl-functionalized polymers (and/or other soft block component). As a result, physical, mechanical, and chemical properties of the block copolymer can be better tailored for a desired application.

The copolymers can be manufactured, for example, in continuous, semi-continuous, and/or batch processes using extruders and solid-state polymerization equipment. In certain embodiments, the invention obviates the use of more expensive reactors typically required for polycondensation processes. Such reactors generally are highly engineered and energy intensive. In certain embodiments, the invention increases production flexibility and productivity by allowing faster product changeovers and higher yields on small volume production runs.

In certain embodiments, methods of the invention may be adapted for use with other unit operations in the manufacture of plastic parts, for example, processes including molding, injection molding, extrusion, pultrusion, powder coating, and/or any of the processes described, for example, in co-owned U.S. Pat. No. 6,369,157, Winckler et al., and co-owned U.S. Pat. No. 6,420,047, Winckler et al., the disclosures of which are incorporated herein by reference in their entirety.

The compositions and methods described herein may be used in the manufacture of articles of various sizes and shapes. Articles that may be manufactured include, for example, automotive body panels and chassis components, bumper beams, aircraft wing skins, windmill blades, fluid storage tanks, tractor fenders, tennis rackets, golf shafts, windsurfing masts, toys, rods, tubes, bars, bicycle parts, and machine housings.

In the manufacture of these articles, additional components and/or fillers may be added. Illustrative additives include, for example, colorants, pigments, magnetic materials, antioxidants, UV stabilizers, plasticizers, fire retardants, lubricants, mold releases, and/or other fillers.

In certain embodiments, a solvent may be employed, for example, to assist in the uniform mixing of the macrocyclic polyester oligomer with the soft block component and catalyst in the extruder (or mixer, or other shear-producing unit operation). Various solvents can be used, and there is generally no limitation with respect to the type of solvent that may be used other than that the solvent should be substantially free of water to avoid deactivation of catalyst. Illustrative examples of solvents that may be employed in the invention include o-dichlorobenzene, toluene, methanol, ethanol, isopropanol, acetone, methyl ethyl ketone, benzene, o-xylene, chlorobenzene, dichloromethane, and chloroform.

In certain embodiments, the invention relates to a one-part, ready-to-polymerize blend including MPO (hard block reactant), a soft block reactant (a dihydroxyl-functionalized polymer, an oligoether, and/or a dimerized fatty acid), and a catalyst. The blend may also contain one or more fillers and/or other substances. The one-part blend remains stable for at least a day, at least 2 days, at least 3 days, at least a week, at least a month, or at least a year or more, without significant premature polymerization of MPO and without significant deactivation of catalyst. When it is desired to polymerize the MPO, the one-part blend is exposed to a temperature sufficient to melt and polymerize the MPO, whereupon polymerization and crystallization may occur substantially isothermally. The blend may be used, for example, as a one-part, ready-to polymerize composition for preparing a product via molding, injection molding, extrusion, pultrusion, and/or any of the processes described, for example, in co-owned U.S. Pat. No. 6,420,047 by Winckler et al., the text of which is incorporated herein by reference in its entirety.

It is contemplated that methods, systems, and processes that are embodiments of the claimed invention encompass scale-ups, variations, and adaptations developed using information from, the embodiments described herein. For example, embodiments of the invention include pilot plant and plant-scale manufacturing processes whose feasibility is demonstrated by the laboratory-scale experiments described herein. Processes described herein may be conducted in batch, semi-continuous, and/or continuous operation. Scale-up of systems from laboratory to plant scale may be performed by those of ordinary skill in the field of polymer manufacturing and processing. For example, those of ordinary skill in this field may select process equipment, design experiments for obtaining kinetic data, develop and apply models for equipment and process design, develop economically optimum equipment and process design, and/or validate equipment and process designs via pilot plant and/or full scale reactor experiments. It is also contemplated that methods, systems, and processes of the claimed invention may include pumps, heat exchangers, and gas-, liquid-, and/or solid-phase material handling equipment known to those of ordinary skill in the field of polymer manufacturing and processing.

Throughout the description, where compositions, mixtures, blends, and composites are described as having, including, or comprising specific components, or where processes and methods are described as having, including, or comprising specific steps, it is contemplated that, additionally, there are compositions, mixtures, blends, and composites of the present invention that consist essentially of, or consist of, the recited components, and that there are processes and methods of the present invention that consist essentially of, or consist of, the recited processing steps.

It should be understood that the order of steps or order for performing certain actions is immaterial so long as the invention remains operable. Moreover, two or more steps or actions may be conducted simultaneously.

The mention herein of any publication, for example, in the Background section, is not an admission that the publication serves as prior art with respect to any of the claims presented herein. The Background section is presented for purposes of clarity and is not meant as a description of prior art with respect to any claim.

The following general definitions may be helpful in understanding the various terms and expressions used in this specification.

DEFINITIONS

As used herein, "macrocyclic" is understood to mean a cyclic molecule having at least one ring within its molecular structure that contains 5 or more atoms covalently connected to form the ring.

As used herein, an "oligomer" is understood to mean a molecule that contains one or more identifiable structural repeat units of the same or different formula.

As used herein, a "macrocyclic polyester oligomer" (MPO) is understood to mean a macrocyclic oligomer containing structural repeat units having an ester functionality. A macrocyclic polyester oligomer typically refers to multiple molecules of one specific repeat unit formula. However, a macrocyclic polyester oligomer also may include multiple molecules of different or mixed formulae having varying numbers of the same or different structural repeat units. In addition, a macrocyclic polyester oligomer may be a co-polyester or multi-component polyester oligomer, i.e., an oligomer having two or more different structural repeat units having ester functionality within one cyclic molecule.

As used herein, "substantially homo- or co-polyester oligomer" is understood to mean a polyester oligomer wherein the structural repeat units are substantially identical or substantially composed of two or more different structural repeat units, respectively.

As used herein, an "alkylene group" is understood to mean $-C_nH_{2n}-$, where $n \geq 2$.

As used herein, a "cycloalkylene group" is understood to mean a cyclic alkylene group, $-C_nH_{2n-x}-$, where x represents the number of H's replaced by cyclization(s).

As used herein, a "mono- or polyoxyalkylene group" is understood to mean $[-(CH_2)_m-O-]_n-(CH_2)_m-$, wherein m is an integer greater than 1 and n is an integer greater than 0.

As used herein, a "divalent aromatic group" is understood to mean an aromatic group with links to other parts of the macrocyclic molecule. For example, a divalent aromatic group may include a meta- or para-linked monocyclic aromatic group (e.g., benzene).

As used herein, an "alicyclic group" is understood to mean a non-aromatic hydrocarbon group containing a cyclic structure within.

As used herein, a "filler" is understood to mean a material other than a macrocyclic polyester oligomer or a polymerization catalyst that may be included in a blend containing MPO and which may be present in a polymer composition resulting from polymerization of an MPO-containing blend. A filler may be used to achieve a desired purpose or property, and may be present or transformed into known and/or unknown substances in the resulting polyester polymer. For example, the purpose of the filler may be to provide stability, such as chemical, thermal, or light stability, to the blend material or the polymer composition; to increase the strength of the polymer composition/product; and/or to increase electrical and/or thermal conductivity of the blend material and/or the polymer composition. A filler also may provide or reduce color, provide weight or bulk to achieve a particular density, provide reduced gas and vapor permeability, provide flame or smoking resistance (i.e., be a flame retardant), be a substitute for a more expensive material, facilitate processing, and/or provide other desirable properties. Illustrative examples of fillers are, among others, graphite, exfoliated graphite, carbon nanotubes, carbon black, carbon fibers, buckminsterfullerene, diamond, anhydrous magnesium silicate (anhydrous talc), fumed silica, titanium dioxide, calcium carbonate, wollastonite, chopped fibers, fly ash, glass, glass fiber, milled glass fiber, glass microspheres, micro-balloons, crushed stone, nanoclay, linear polymers, monomers, branched polymers, engineering resin, impact modifiers, organoclays, and pigments. Multiple fillers may be included in MPO blends, for example, to achieve a balance of properties. For example, an impact modifier may be added to an MPO blend containing exfoliated graphite so that the resulting blend and/or polymer composition exhibits high impact resistance as well as high electrical conductivity.

As used herein, a "$C_{1-4}$ primary alkyl group" is understood to mean an alkyl group having 1 to 4 carbon atoms connected via a primary carbon atom.

As used herein, a "$C_{1-10}$ alkyl group" is understood to mean an alkyl group having 1 to 10 carbon atoms, including straight chain or branched radicals.

As used herein, a "methylene group" is understood to mean $-CH_2-$.

As used herein, an "ethylene group" is understood to mean $-CH_2-CH_2-$.

As used herein, a "$C_{2-3}$ alkylene group" is understood to mean $-C_nH_{2n}-$, where n is 2 or 3.

As used herein, a "$C_{2-6}$ alkylene group" is understood to mean $-C_nH_{2n}-$, where n is 2-6.

As used herein, "dihydroxyl-functionalized polymer" is understood to mean a polymer having at least two hydroxyl functional groups. Typically, the at least two hydroxyl functional groups are at the ends of a polymer chain. However, the polymer may be branched and each of the two or more of the branches of the polymer chain may have a hydroxyl functionalized end.

As used herein, "oligoether" is understood to mean an oligomer containing structural repeat units having an ether functionality.

As used herein, "dimerized fatty acid" is understood to mean the dimerization product of mono- or polyunsaturated fatty acids.

The following headers are provided as a general organizational guide and do not serve to limit support for any given element of the invention to a particular section of the Description.

I. Macrocyclic Polyester Oligomer

A macrocyclic polyester oligomer may also be referred to as a macrocyclic oligoester and is abbreviated herein as MPO. Many different MPOs can be made and are useful in various embodiments of this invention. Thus, depending on the desired properties of the block copolymer, the appropriate MPO(s) can be selected for use in its manufacture.

MPOs that may be employed in this invention include, but are not limited to, macrocyclic poly(alkylene dicarboxylate) oligomers having a structural repeat unit of Formula I:

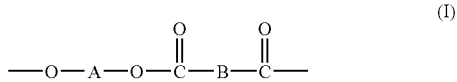

(I)

where A is an alkylene, or a cycloalkylene or a mono- or polyoxyalkylene group; and B is a divalent aromatic or alicyclic group.

Preferred MPOs include macrocyclic poly(1,4-butylene terephthalate) (cPBT), macrocyclic poly(1,3-propylene terephthalate) (cPPT), macrocyclic poly(1,4-cyclohexylene-dimethylene terephthalate) (cPCT), macrocyclic poly(ethylene terephthalate) (PET), and macrocyclic poly(1,2-ethylene 2,6-naphthalenedicarboxylate) (cPEN) oligomers, and copolyester oligomers comprising two or more of the above monomer repeat units.

MPOs may be prepared by known methods. Synthesis of the preferred MPOs may include the step of contacting at least one diol of the formula HO-A-OH with at least one diacid chloride of Formula IV:

(IV)

where A and B are as defined above. The reaction typically is conducted in the presence of at least one amine that has substantially no steric hindrance around the basic nitrogen atom. An illustrative example of such amines is 1,4-diazabicyclo[2.2.2]octane (DABCO). The reaction usually is conducted under substantially anhydrous conditions in a substantially water immiscible organic solvent such as methylene chloride. The temperature of the reaction typically is between about −25° C. and about 25° C. See, e.g., U.S. Pat. No. 5,039,783 to Brunelle et al.

MPOs have also been prepared via the condensation of a diacid chloride with at least one bis(hydroxyalkyl) ester such as bis(4-hydroxybutyl) terephthalate in the presence of a highly unhindered amine or a mixture thereof with at least one other tertiary amine such as triethylamine, in a substantially inert organic solvent such as methylene chloride, chlorobenzene, or a mixture thereof. See, e.g., U.S. Pat. No. 5,231,161 to Brunelle et al.

Another method for preparing MPOs is to depolymerize linear polyester polymers in the presence of an organotin or titanate compound. In this method, linear polyesters are converted to macrocyclic polyester oligomers by heating a mixture of linear polyesters, an organic solvent, and a transesterification catalyst such as a tin or titanium compound. The solvents used, such as o-xylene and o-dichlorobenzene, usually are substantially free of oxygen and water. See, e.g., U.S. Pat. Nos. 5,407,984 to Brunelle et al. and 5,668,186 to Brunelle et al. Production and depolymerization of low-acid polyalkylene terephthalate to prepare MPO is described in co-owned U.S. Provisional Patent Application No. 60/665, 648, by Phelps et al.

MPOs have been prepared from intermediate molecular weight polyesters by contacting a dicarboxylic acid or a dicarboxylate in the presence of a catalyst to produce a composition comprising a hydroxyalkyl-terminated polyester oligomer. The hydroxyalkyl-terminated polyester oligomer is heated to produce a composition comprising an intermediate molecular weight polyester which preferably has a molecular weight between about 20,000 Daltons and about 70,000 Daltons. The intermediate molecular weight polyester is heated and a solvent is added prior to or during the heating process to produce a composition comprising an MPO. See, e.g., U.S. Pat. No. 6,525,164, to Faler.

MPOs that are substantially free from macrocyclic co-oligoesters have been prepared by depolymerizing polyesters using the organo-titanate catalysts described in co-owned U.S. Pat. No. 6,787,632, by Phelps et al.

It is also within the scope of the invention to employ macrocyclic homo- and co-polyester oligomers. Therefore, unless otherwise stated, an embodiment of a composition, article, process, or method that refers to a macrocyclic polyester oligomer also includes co-polyester embodiments.

In one embodiment, macrocyclic ester homo- and co-oligomers used in this invention include oligomers having a general structural repeat unit of Formula V:

(V)

where A' is an alkylene, cycloalkylene, or mono- or polyoxyalkylene group, and where A' may be substituted, unsubstituted, branched, and/or linear. Example MPOs of this type include butyrolactone and caprolactone, where the degree of polymerization is one, and 2,5-dioxo-1,4-dioxane, and lactide, where degree of polymerization is two. The degree of polymerization may alternatively be 3, 4, 5, or higher. Molecular structures of 2,5-dioxo-1,4-dioxane and lactide, respectively, appear below (Formulas VI and VII):

(VI)

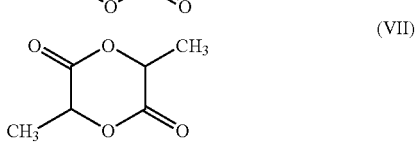

(VII)

MPOs used in various embodiments of the invention generally include species of different degrees of polymerization. Here, a degree of polymerization (DP) with respect to the MPO means the number of identifiable structural repeat units in the oligomeric backbone. The structural repeat units may have the same or different molecular structure. For example, an MPO may include dimer, trimer, tetramer, pentamer, and/or other species.

In certain embodiments, the MPO is a composition comprising from about 30 to about 45 wt. % dimer species, from about 30 to about 45 wt. % trimer species, from about 0 to about 10 wt. % tetramer species, and from about 5 wt. % to about 20 wt. % pentamer species. MPO formulations outside these ranges may be used, as well. Certain embodiments of the invention may include modifying compositions of MPOs.

Various exemplary methods of modifying compositions of MPOs are described in co-owned U.S. Pat. No. 6,436,548.

II. Dihydroxyl-Functionalized Polymers, Oligoethers, and Dimerized Fatty Acids Various dihydroxyl-functionalized polymers, oligoethers, and dimerized fatty acids are useful in the practice of embodiments of this invention. Thus, depending on the desired properties of the final polyester polymer product, the appropriate dihydroxyl-functionalized polymer(s), oligoether(s), and/or dimerized fatty acid(s) can be selected for use in its manufacture.

The dihydroxyl-functionalized polymers employed in various embodiments of the invention include any dihydroxyl-functionalized polymer that may react with a macrocyclic polyester oligomer to form a block copolymer under transesterification conditions. Illustrative examples of these dihydroxyl-functionalized polymers include dihydroxyl-functionalized poly(alkylene terephthalate), dihydroxyl-functionalized poly(ethylene terephthalate), dihydroxyl-functionalized poly(butylene terephthalate), a dimer diol, a polyolefin diol, a polycaprolactone diol, a polyperfluoroether diol, and a polysiloxane diol. Most or all of these dihydroxyl-functionalized polymers are commercially available.

The oligoethers employed in various embodiments of the invention include any oligoether that may react with an MPO to form a block copolymer under transesterification conditions. These oligoethers include, for example, a poly(alkylene ether) glycol and a poly(alkylene oxide), for example, poly(ethylene ether) glycol, poly(propylene ether) glycol, poly(tetramethylene ether) glycol, and poly(tetramethylene oxide). These oligoethers are commercially available, including, for example, Terathane® 2900 manufactured by E.I. duPont Nemours and Company.

The dimerized fatty acids employed in various embodiments of the invention include any dimerized fatty acid that may react with an MPO to form a block copolymer under transesterification conditions. Illustrative examples of the dimerized fatty acids used in this invention include, for example, the dimerization products of oleic acid, linoleic acid, palmitoleic acid, elaidic acid, and erucic acid. The dimerization products obtained in the hydrolysis of natural fats and oils, including, for example, sunflower oil, soybean oil, olive oil, rapeseed oil, cottonseed oil, and tall oil, may also be employed in this invention. These dimerized fatty acids are commercially available.

Copolymers of the invention include copolymers having a hard block of one or more MPOs (hard block oligomers) and a soft block of at least one of a dihydroxyl-functionalized polymer, an oligoether, and a dimerized fatty acid (soft block oligomers). In certain embodiments, the weight ratio of soft block oligomers to hard block oligomers is at least about 10:90, at least about 15:85, at least about 20:80, at least about 25:75, at least about 30:70, at least about 35:65, at least about 40:60, at least about 45:55, or at least about 50:50.

The dihydroxyl-functionalized polymers, oligoethers, and dimerized fatty acids used in various embodiments may have molecular weight (i.e. number average molecular weight), for example, greater than 1000 g/mol, greater than 2000 g/mol, greater than 2500 g/mol, greater than 5000 g/mol, greater than 7500 g/mol, greater than 10,000 g/mol, greater than 15,000 g/mol, greater than 20,000 g/mol, or greater than 25,000 g/mol. In one embodiment, the dihydroxyl-functionalized polymers, oligoethers, and/or dimerized fatty acids used have a molecular weight within a range from about 1000 to about 100,000. In another embodiment, the molecular weight is within a range from about 1000 to about 10,000.

III. Co-Polymerization Catalyst

Catalysts employed in certain embodiments of the invention are capable of catalyzing the reactions in the production of block copolymers from MPO and soft block oligomers (i.e. dihydroxyl-functionalized polymer). As with state-of-the-art processes for performing ester-ester interchange-based, cyclic ring-opening polymerization of MPOs, organotin and organotitanate compounds are the preferred catalysts, although other catalysts may be used. For example, catalysts which may be used include those described in co-owned U.S. Pat. Nos. 5,407,984 to Brunelle et al.; 5,498,651 to Brunelle; 5,527,976 to Takekoshi et al.; 5,661,214 to Brunelle et al.; and 5,710,086 to Brunelle et al. For example, butyltin chloride dihydroxide (i.e. n-butyltin(IV) chloride dihydroxide) may be used as catalyst. Other illustrative organotin compounds include dialkyltin(IV) oxides, such as di-n-butyltin(IV) oxide and di-n-octyltin oxide, and acyclic and cyclic monoalkyltin (IV) derivatives such as n-butyltin tri-n-butoxide, dialkyltin (IV) dialkoxides such as di-n-butyltin(IV) di-n-butoxide and 2,2-di-n-butyl-2-stanna-1,3-dioxacycloheptane, and trialkyltin alkoxides such as tributyltin ethoxide. Another illustrative organotin compound that may be used as polymerization catalyst is 1,1,6,6-tetra-n-butyl-1,6-distanna-2,5,7,10-tetraoxacyclodecane. See, e.g., U.S. Pat. No. 5,348,985 to Pearce et al.

Also, trisstannonoxanes having the general Formula VIII shown below can be used as a polymerization catalyst to produce branched polyester copolymers.

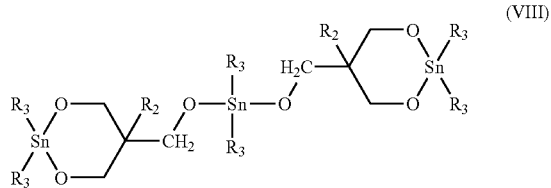

(VIII)

where $R_2$ is a $C_{1-4}$ primary alkyl group and $R_3$ is $C_{1-10}$ alkyl group.

Additionally, organotin compounds with the general Formula IX shown below can be used as a polymerization catalyst to prepare branched polyester copolymers from MPOs and soft block oligomers:

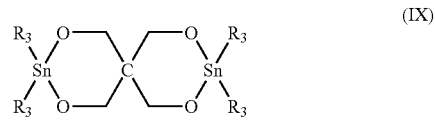

(IX)

where $R_3$ is defined as above.

Examples of titanate compounds that can be used as catalyst include tetra(2-ethylhexyl) titanate, tetraisopropyl titanate, tetrabutyl titanate, and titanate tetraalkoxide compounds with the general Formula X shown below:

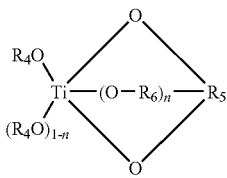

(X)

where each $R_4$ is independently an alkyl group, or the two $R_4$ groups taken together form a divalent aliphatic hydrocarbon group, $R_5$ is a $C_{2-10}$ divalent or trivalent aliphatic hydrocarbon group, $R_6$ is a methylene or ethylene group, and n is 0 or 1. Examples of these titanate compounds with the above general Formula X are shown in Table 1:

TABLE I

Examples of Titanate Compounds Having Formula X

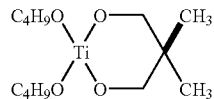

Di-1-butyl 2,2-dimethylpropane-1,3-dioxytitanate

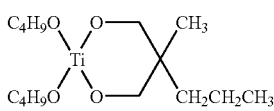

Di-1-butyl 2(1-propyl)-2-methylpropane-1,3-dioxytitanate

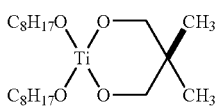

Di(2-ethyl-1-hexyl) 2,2-dimethylpropane-1,3-dioxytitanate

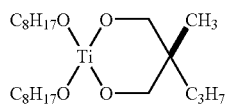

Di(2-ethyl-1-hexyl) 2-(1-propyl)-2-methylpropane-1,3-dioxytitanate

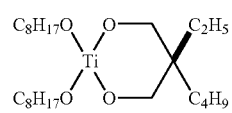

Di(2-ethyl-1-hexyl) 2-(1-butyl)-2-ethylpropane-1,3-dioxytitanate

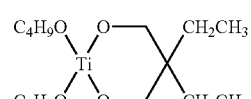

Di-1-butyl 2,2-diethylpropane-1,3-dioxytitanate

TABLE I-continued

Examples of Titanate Compounds Having Formula X

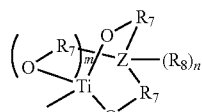

Di-1-butyl 2-ethylhexane-1,3-dioxytitanate

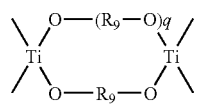

Di(2-ethyl-1-hexyl) 2,2-diethylpropane-1,3-dioxytitanate

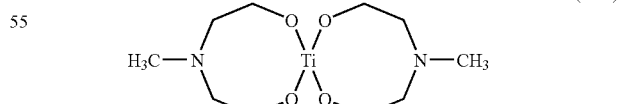

Di(2-ethyl-1-hexyl) 2-ethylhexane-1,3-dioxytitanate

Titanate ester compounds having at least one moiety of the general Formula XI or Formula XII, shown below, can also be used as catalysts.

(XI)

(XII)

where each $R_7$ is independently a $C_{2-3}$ alkylene group; $R_8$ is a $C_{1-6}$ alkyl group or unsubstituted or substituted phenyl group; Z is O or N; provided when Z is O, m=n=0, and when Z is N, m=0 or 1 and m+n=1; each $R_9$ is independently a $C_{2-6}$ alkylene group; and q is 0 or 1.

Examples of such titanate compounds are shown below as Formula XIII and Formula XIV:

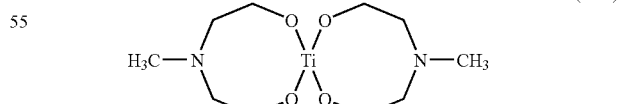

(XIII)

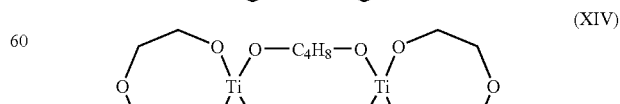

(XIV)

Other catalysts which may be used include aryl titanates, described, for example, in co-owned U.S. Pat. No. 6,906,147, by Wang. Also, polymer-containing organo-metal catalysts may be used in the invention. These include the polymer-containing catalysts described in co-owned U.S. Pat. No. 6,831,138, by Wang.

In one embodiment, the polymerization catalyst is present within a range from about 0.01 mol to about 10 mol per 100 mol monomer repeat units. Amounts of catalyst to be used may be determined via experimentation with systems of interest.

IV. Block Copolymer

In certain embodiments, a block copolymer is made by reacting one or more macrocyclic polyester oligomers (MPOs), the hard block component, with a soft block component including dihydroxyl-functionalized polymer(s), oligoether(s), and/or dimerized fatty acid(s) in an extruder, mixer, blender, or other shear-producing device. The reaction takes place in the shear-producing device at elevated temperature, in the presence of catalyst.

The ingredients of the mixture used to produce the block copolymer may be introduced into the extruder in any order, as long as they come into contact with each other at some point during extrusion, mixing, or blending. Contact of the MPO and the soft block oligomer may be accomplished through any shearing process that enhances the dispersion of the soft block oligomer with the MPO. Preferably, shearing occurs in an extruder, for example, a single screw or twin screw extruder. The shearing process may be a batch process, or it may be a continuous or semi-continuous process.

The reaction of the mixture components is carried out at an elevated temperature. The reaction is preferably carried out at a temperature within a range from about 130° C. to about 300° C. In certain embodiments, the reaction is carried out at a temperature within a range from about 230° C. to about 260° C. Temperatures may vary throughout the extruder. The reaction may be take place at atmospheric pressure, above atmospheric pressure, or below atmospheric pressure. For example, the reaction may take place under an inert gas, such nitrogen or argon, or under vacuum.

The block co-polymerization reaction in the extruder is generally completed within minutes, for example, and this time can be set as the average residence time of material in the extruder. In certain embodiments, reaction may occur faster or slower. The duration of the reaction depends on various factors, for example, the desired extent of reaction, the desired molecular weight following the extrusion step (and before solid state polymerization), the viscosity of the reactants (affects extruder throughput), the concentrations and types of reactants, the concentration and type of catalyst, the ratio of the MPO to the soft block oligomer, the temperature, the pressure, and other reaction conditions.

The yield of block copolymer is a function, for example, of the amount and type of reactants, including macrocyclic oligoester(s), dihydroxyl-functionalized polymer(s), oligoether(s), dimerized fatty acid(s), catalyst(s), etc.; the reaction time; and the reaction conditions. In certain embodiments, the yield of block copolymer is greater than about 60%, greater than about 70%, greater than about 80%, greater than about 90%, or greater than about 95%, for example, based on amount of MPO consumed.

In preferred embodiments, the extruded reaction product is a solid, or becomes a solid, and can undergo solid state polymerization to increase its molecular weight. In certain embodiments, the extruded block copolymer includes a hard block and a soft block. The hard block preferably includes a polyester group contributed by the MPO, and the soft block preferably includes a substituted or unsubstituted alkylene, cycloalkylene, or mono- or polyoxyalkylene group contributed by a dihydroxyl-functionalized polymer, an oligoether, and/or a dimerized fatty acid. The ratio of the hard block to the soft block may be selected to provide a desired physical property. For example, block copolymers having a low ratio of hard block to soft block exhibit increased toughness and become elastomeric, and in some cases provide inherently dissipative polymers (IDPs).

V. Heating the Block Copolymer to Increase Molecular Weight

In certain embodiments, the extruded block copolymer has relatively low molecular weight upon extrusion, and an additional step is performed to increase its molecular weight. In certain embodiments, the extruded block copolymer is heated at a pressure below atmospheric pressure (i.e. under vacuum). In general, no additional catalyst need be added, although in certain embodiments, additional catalyst is added prior to this heating step (i.e. the same or a different catalyst than used during initial polymerization). In certain embodiments, some residual active catalyst remains following initial polymerization and is useful in the subsequent heating step; however, in certain embodiments, no active catalyst is needed to perform the solid state polymerization.

In certain embodiments, the block copolymer is heated at temperature within a range from about 180° C. to about 250° C., from about 190° C. to about 240° C., or from about 200° C. to about 220° C. In certain embodiments, the heating temperature is at least about 100° C., at least about 150° C., at least about 175° C., at least about 190° C., or at least about 200° C. In general, less time is required for molecular weight increase at higher temperatures. The temperature may be chosen depending on the block copolymer, the catalyst, the desired molecular weight, the desired reaction time, and other factors. In certain embodiments, a solid state polymerization is performed, where the block copolymer is heated under vacuum, that is, at a pressure below atmospheric pressure. In certain embodiments, a vacuum is pulled such that the pressure is no greater than about 100 torr, no greater than about 20 torr, no greater than about 5 torr, or no greater than about 0.5 torr. The block copolymer is preferably heated for up to about 16 hours, although it may be heated longer. In certain embodiments, the block copolymer is heated for a period of time from about 2 hours to about 16 hours, or from about 4 hours to about 8 hours. This heating step may be performed using solid-state polymerization equipment, although other process equipment may be used. In one embodiment, the process equipment used to perform the initial polymerization is the same as the equipment used to perform the molecular weight increase step; however, in general, the two steps are performed using different process equipment.

In certain embodiments, the heating step increases the molecular weight of the block copolymer by a factor of at least about 2, at least about 3, at least about 4, at least about 5, at least about 6, at least about 7, at least about 8, at least about 9, or at least about 10. Following the molecular weight increase step, in certain embodiments, the block copolymer has molecular weight (i.e. weight average molecular weight relative to GPC polystyrene standards) of at least about 30,000, at least about 50,000, at least about 100,000, at least about 125,000, at least about 150,000, at least about 175,000, at least about 200,000, at least about 225,000, at least about 250,000, at least about 275,000, or at least about 300,000.

VI. Contact of Resulting Higher Molecular Weight Block Copolymer with an Ester Because of the improved versatility provided by various embodiments of the invention, it is possible to produce block copolymers with unique properties that would otherwise be difficult or impossible to make. For example, it is possible to adjust the melting point and crystallinity of the hard block portion of the above-described high molecular weight block copolymer by reacting the block copolymer with an ester other than MPO—for example, a cyclic ester such as caprolactone, or polycaprolactone—in the presence of a transesterification catalyst. The result is a hard block portion of the copolymer that contains a random configuration of units contributed by the MPO and the ester. The ester may be chosen to increase the overall miscibility and microphase separation characteristics of the hard block and soft block portions of the copolymer, thereby changing the physical, mechanical, and/or chemical properties of the copolymer.

Thus, in certain embodiments, such a block copolymer is formed by contacting any of the above-described block copolymers with an ester of Formula II in the presence of a transesterification catalyst, at an elevated temperature:

$$—R_1—O—C(O)—R_2— \quad\quad (II)$$

where each of $R_1$ and $R_2$ is independently a divalent organic moiety, and $R_1$ is not —O-A'- if $R_2$ is —B'—C(O)—, where A' is an alkylene, a cycloalkylene, or a mono- or polyoxyalkylene group and B' is a divalent aromatic or alicyclic group. In one embodiment, the block copolymer has undergone the above-described heating process to increase its molecular weight prior to being contacted with the ester of Formula II; however, it is possible to prepare the altered block copolymer by contact with the ester of Formula II prior to the solid state polymerization step to increase molecular weight.

The ester may be any ester that is capable of undergoing transesterification. The ester may be, for example, a cyclic ester and/or an aliphatic or aromatic polyester. In certain preferred embodiments, the cyclic ester is a lactone, for example, a polycaprolactone. The transesterification catalyst may be a tin compound or a titanate compound, as described above. In one embodiment, the transesterification catalyst used in this step is the same as that used to initially polymerize the MPO and soft block component, and/or the same that is present during the solid state polymerization step. The elevated temperature at which the block copolymer is contacted with an ester is preferably within a range from about 100° C. to about 300° C. The temperature of reaction may be chosen based on the reactants, concentrations, and other reaction conditions.

In certain embodiments, the resulting novel block copolymer includes (a) a first block unit comprising, within its polymeric backbone, at least one structural unit of Formula I:

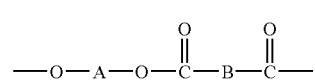

(I)

where A is an alkylene, or a cycloalkylene or a mono- or polyoxyalkylene group, and B is a divalent aromatic or alicyclic group; and at least one structural unit of Formula II:

$$—R_1—O—C(O)—R_2— \quad\quad (II)$$

where each of $R_1$ and $R_2$ is independently a divalent organic moiety; and (b) a second block unit comprising, within its polymeric backbone, at least one structural unit of Formula III:

$$-D- \quad\quad (III)$$

where D is an alkylene, or a cycloalkylene or a mono- or polyoxyalkylene group, and where one or more of the carbon atoms in D may be replaced with an oxygen atom, a nitrogen atom, or a sulfur atom. D may include, for example, at least one of a polyalkylene ether group, a polyolefin group, a polycaprolactone group, a polyperfluoroether diol, a dimer diol, and a polysiloxane diol. $R_1$ is not —O-A'- if $R_2$ is —B'—C(O)—, where A' is an alkylene, a cycloalkylene, or a mono- or polyoxyalkylene group and B' is a divalent aromatic or alicyclic group. In one embodiment, the first block unit of the resulting block copolymer has a random configuration of structural units of Formulas I and II.

In certain embodiments, the molecular weight (i.e. weight average molecular weight relative to GPC polystyrene standards) of the resulting block copolymer is within a range from about 30,000 to about 300,000. The molecular weight of the block copolymer is preferably within a range from about 40,000 to about 220,000. In certain embodiments, the block copolymer has a molecular weight of at least about 30,000, at least about 50,000, at least about 100,000, at least about 125,000, at least about 150,000, at least about 175,000, at least about 200,000, at least about 225,000, at least about 250,000, at least about 275,000, or at least about 300,000.

VII. Blends

The high molecular weight block copolymers described herein may be of interest as elastomeric materials or as blend compatibilizers in polymer systems. As described above, highly polar hydroxyl-functionalized polymers—for example, glycols such as polyethylene glycol—may be used in the above-described methods to make block copolymers that are inherently dissipative polymers (IDPs). IDPs can be used, for example, in blends with commercial polymer(s) to provide antistatic properties. IDPs can be blended with any of a number of commercial polymers—for example, ABS, polycarbonate, polystyrene, and polyolefins—with a minimal effect on other properties. IDPs offer advantages over antistatic agents; for example, IDPs do not leach out of the host polymer as do antistats, and the performance of IDPs are not a function of atmospheric humidity because, unlike antistats, IDPs work within the host resin, not on the surface In certain embodiments, it is not necessary that the highly polar component form part of the copolymer itself, as long as a blend of the highly polar polymer and a block copolymer can be prepared that is sufficiently miscible and/or does not exhibit excessive phase separation. Because block copolymers of certain embodiments of the invention can be made with a high relative amount of soft block component (which are miscible with highly polar components), it is possible to create non-separating blends of highly polar polymer with such block copolymers. Therefore, a blend may be prepared that has inherently dissipative properties and which may, in turn, be blended with commercially available polymers, for example, to provide antistatic properties.

Therefore, in certain embodiments, a blend is produced which includes (a) a block copolymer comprising a first block unit including, within its polymeric backbone, at least one structural unit of Formula I:

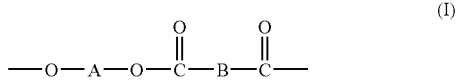

where A is an alkylene, or a cycloalkylene or a mono- or polyoxyalkylene group, and B is a divalent aromatic or alicyclic group; and a second block unit including, within its polymeric backbone, at least one second structural unit of Formula III:

where D is an alkylene, or a cycloalkylene or a mono- or polyoxyalkylene group, and one or more of the carbon atoms in D may be replaced with an oxygen atom, a nitrogen atom, or a sulfur atom; and (b) a hydroxyl-functionalized polymer an oligoether and/or a dimerized fatty acid.

D may include, for example, a polyalkylene ether group, a polyethylene ether group, a polypropylene ether group, a polymethylene ether group, a polyolefin group, a polycaprolactone group, a polyperfluoroether diol, a dimer diol, and a polysiloxane diol.

In certain embodiments, the block copolymer is present in the blend in an amount less than about 90 weight percent, less than about 80 weight percent, less than about 70 weight percent, less than about 60 weight percent, less than about 50 weight percent, less than about 40 weight percent, or less than about 30 weight percent.

VIII. Experimental Examples

The experimental examples demonstrate preparation of high molecular weight block copolymers resulting from the extrusion of a macrocyclic polyester oligomer (MPO) (a hard block component) with a large proportion of soft block component such as a dihydroxyl-functionalized polymer, an oligoether, and/or a dimerized fatty acid, followed by exposure to heat under vacuum.

The MPO used in the experimental examples is macrocyclic poly(1,4-butylene terephthalate) oligomer (referred to herein as cPBT, for simplicity). The cPBT was provided pre-mixed with catalyst, the mixture having product number XB3-CA4, manufactured by Cyclics Corporation of Schenectady, N.Y. XB3-CA4 is a pre-blended mixture containing cPBT and 0.3 mol % Fascat® 4101 catalyst from Atofina of Philadelphia, Pa. Fascat® 4101 is butylchlorotin dihydroxide and has molecular formula $C_4H_9Sn(OH)_2Cl$.

In Example 1, a solid mixture containing 75 wt % XB3-CA4 and 25 wt % Terathane® 2900 was extruded in a Randcastle single-screw extruder at temperatures ranging from about 240° C. to about 260° C. GPC analysis showed that the isolated copolymer had a molecular weight of 38,000 and greater than 90% conversion of the CBT oligomer into polymeric material.

In Example 2, the PBT-polytetramethylene ether glycol block copolymer from Example 1 was placed in test tubes fitted with vacuum adaptors and heated at 210° C. for up to 16 hours under vacuum. The resulting polymers were analyzed by GPC to determine the increase in molecular weight. The results of the analysis are summarized in Table 2. In the table, $M_w$ stands for weight-average molecular weight, and $M_p$ stands for peak average molecular weight.

In Example 3, a solid mixture containing 50 wt. % XB3-CA4 and 50 wt. % Terathane® 2900 (a larger proportion of soft block component than in Example 1) was extruded in a Randcastle single-screw extruder with barrel temperatures ranging from about 250° C. to about 260° C. GPC analysis showed that the isolated copolymer had a molecular weight of 18,000 (weight average molecular weight relative to GPC polystyrene standards) and about 94% conversion of the CBT oligomer into polymeric material.

In Example 4, the PBT-polytetramethylene ether glycol block copolymer from Example 3 was heated at 210° C. in various batches for 3 to 6 hours each, and the batches were combined. The combined batches had average molecular weight 190,000 g/mol. The material was then injection molded into tensile bars for physical property testing. The results are shown in Table 3. The 50/50 PBT-polytetramethylene ether glycol block copolymer performed favorably to various commercially-available thermoplastic polyester elastomers.

Example 1

Extrusion of MPO and Dihydroxyl-Functionalized Polymer (75:25 Weight Ratio) to Produce Low Molecular Weight Block Copolymer About 300 g of XB3-CA4 was dried at 80° C. for more than 16 hours under vacuum. About 100 g of Terathane® 2900 (polytetramethylene ether glycol, molecular weight of 2900, manufactured by E.I. duPont de Nemours and Company) was ground to a powder after being frozen with liquid nitrogen. The ground Terathane® 2900 was then dried under vacuum at room temperature for at least 12 hours with nitrogen flow. The Terathane® 2900 was powder mixed with the XB3-CA4 in a 1-liter glass container by tumbling for 1 hour. The mixture was then sieved to produce a +100-30 mesh powder. The mixture was fed into a Randcastle single screw extruder, with a cooled neck and nitrogen sparge, for polymerization. The temperatures in the extruder ranged from about 230° C. to about 260° C. The extruder screw speed was approximately 25 rpm. This process produced a low molecular weight block copolymer with sufficient strength to produce a 0.005" diameter string. This string was collected in a cool water bath, dried, and later ground with liquid nitrogen to produce small pellets.

Example 2

Heat and Vacuum Treatment of Low Molecular Weight Block Copolymer from Example 1

Samples of 0.4 to 0.5 g of material from Example 1 were placed into 13×100 glass test tubes. Four samples were placed on a manifold under vacuum then lowered into a 210° C. bath. Samples were removed at 0.5, 1, 2, and 8 hours. The vacuum was released each time a sample was removed, and then, reapplied. The 4-hour sample was added after one of the other samples was removed and the 16-hour sample was handled separately. The molecular weight and the percent conversion of the samples were tested by GPC analysis using polystyrene standards for calibration (Table 2).

TABLE 2

Effect of Heat and Vacuum Treatment on PBT-Polytetramethylene Ether Glycol Block Copolymers

| Wt. % XB3-CA4 | Wt. % Terathane 2900 | Solid-State Polymerization Temperature (° C.) | Solid-State Polymerization Time (Hours) | GPC $M_w$ | GPC $M_p$ |
|---|---|---|---|---|---|
| 75 | 25 | — | 0 | 38400 | 34300 |
| 75 | 25 | 210 | 0.5 | 120600 | 122500 |
| 75 | 25 | 210 | 1 | 157000 | 163700 |
| 75 | 25 | 210 | 4 | 199700 | 201100 |
| 75 | 25 | 210 | 8 | 193250 | 190890 |
| 75 | 25 | 210 | 16 | 215400 | 204300 |

Example 3

Extrusion of MPO and Dihydroxyl-Functionalized Polymer (50:50 Weight Ratio) to Produce Low Molecular Weight Block Copolymer About 2.3 lbs. of Terathane® 2900 was ground to a powder using liquid nitrogen, and then dried under vacuum at room temperature for at least 12 hours. About 2.3 lbs. of XB3-CA4 was dried in a vacuum oven at 80° C. for 12 hours. The Terathane® 2900 was blended with the XB3-CA4 by shaking the powders together. The mixture was fed into a Randcastle single-screw extruder with barrel temps of 250-260° C. for polymerization. The resulting extrudate was isolated in water, and the pellet/granule material was dried for 8 hours at 80° C. The yield was 4.3 lbs. (a conversion of about 94%). GPC analysis indicated that the material had a molecular weight of 18,000 g/mol. No cPBT oligomer remained.

Example 4

Heat and Vacuum Treatment of Low Molecular Weight Block Copolymer from Example 3

Batches of about 400 g of the resulting block copolymer from Example 3 were placed in 2 L round-bottom flasks treated with external mold release, for example, Zyvex Watershield®. The flasks were heated to 210° C. for 3 to 6 hours under a vacuum of less than 0.5 torr. The flasks were shaken every hour to prevent the pellets of block copolymer from sticking together. All of the batches were combined, and the average molecular weight was determined by GPC analysis to be 190,000 g/mol.

The material was then injection molded into tensile bars for physical property testing. The physical property test results are summarized in the table below and compared to test results of three Hytrel® products, which are thermoplastic polyester elastomers manufactured by DuPont (Table 3).

TABLE 3

Physical Property Test Results of Samples Made With Heat- and Vacuum-Treated PBT-Polytetramethylene Ether Glycol Block Copolymer

| Property | Test Method | CBT-Based Block Copolymer | Hytrel G3548L* | Hytrel G4074* | Hytrel 4056* |
|---|---|---|---|---|---|
| Hardness, Shore D (Maximum) | ISO868 | 39 | 35 | 40 | 40 |
| Flexural Modulus, MPa (23° C.) | ISO178 | 92.7 | 32 | 65 | 62 |
| Tensile Stress @ Break, MPa | ISO527 | 20 | 9.7 | 17 | 30 |
| Elongation @ Break, % | ISO527 | 400 | 240 | 250 | 424 |
| Tensile Stress @ 5%, MPa | ISO527 | 3.5 | | 2.5 | 2.4 |
| Tensile Stress @ 10%, MPa | ISO527 | 5.0 | 2.5 | 4.4 | 4.2 |
| Melting Point, ° C. | ISO 11357-1/-3 | 217 | 154 | 170 | 150 |

*Values from datasheets available on the DuPont website
http://plastics.dupont.com/NASApp/myplastics/Mediator?id=79&p=1&locale=en_US

EQUIVALENTS

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method of making a block copolymer with hard and soft blocks, the method comprising the steps of:
    (a) shearing together at elevated temperature (i) a macrocyclic oligoester and (ii) at least one member selected from the group consisting of a dihydroxyl-functionalized polymer, an oligoether, and a dimerized fatty acid in the presence of a catalyst, thereby forming a block copolymer, wherein the macrocyclic oligoester has a structural repeat unit of formula:

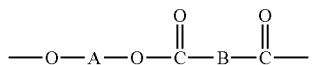

wherein A is an alkylene, a cycloalkylene, or a mono- or polyoxyalkylene group; and B is a divalent aromatic or alicyclic group; and (b) increasing the molecular weight of the block copolymer by heating at a temperature above 80° C. under vacuum.

2. The method of claim 1, wherein step (a) is performed using at least one member selected from the group consisting of an extruder, a mixer, and a blender.

3. The method of claim 1, wherein step (a) is performed using an extruder and wherein step (b) is performed using solid-state polymerization equipment.

4. The method of claim 1, wherein the mixture comprises a dihydroxyl-functionalized polymer having molecular weight greater than 1000.

5. The method of claim 1, wherein the mixture comprises a dihydroxyl-functionalized polymer having molecular weight greater than 2500.

6. The method of claim 1, wherein the weight ratio of block units contributed by component (ii) to component (i) in the block copolymer is at least about 10:90.

7. The method of claim 1, wherein the weight ratio of block units contributed by component (ii) to component (i) in the block copolymer is at least about 25:75.

8. The method of claim 1, wherein step (a) comprises charging an extruder with at least a 25:75 weight ratio of component (ii) to component (i).

9. The method of claim 1, wherein the block copolymer comprises a hard block and a soft block and wherein component (i) contributes to the hard block and component (ii) contributes to the soft block.

10. The method of claim 9, wherein the weight ratio of the soft block to the hard block in the block copolymer is selected to provide a desired property or combination of properties.

11. The method of claim 9, wherein the weight ratio of the soft block to the hard block in the block copolymer is high enough to make the block copolymer inherently dissipative.

12. The method of claim 1, wherein the catalyst is a transesterification catalyst.

13. The method of claim 1, wherein the catalyst comprises a tin compound, a titanate compound, or both.

14. The method of claim 1, wherein step (b) comprises heating the block copolymer to increase its molecular weight by a factor of at least about 2.

15. The method of claim 1, wherein step (b) comprises heating the block copolymer to increase its molecular weight by a factor of at least about 5.

16. The method of claim 1, wherein the block copolymer has molecular weight of at least about 150,000 after step (b).

17. The method of claim 1, wherein the block copolymer has molecular weight of at least about 200,000 after step (b).

18. The method of claim 1, wherein step (a) comprises extruding the mixture at a temperature from about 130° C. to about 300° C.

19. The method of claim 1, wherein step (a) comprises extruding the mixture at a temperature from about 230° C. to about 260° C.

20. The method of claim 1, wherein step (b) comprises heating at a temperature from about 190° C. to about 240° C.

21. The method of claim 1, wherein step (b) comprises heating at a temperature within a range from about 200° C. to about 220° C.

22. The method of claim 1, wherein step (b) comprises heating the block copolymer for a period of time from about 4 hours to about 8 hours.

23. The method of claim 1, wherein step (b) comprises heating the block copolymer at a pressure no greater than about 20 torr.

24. The method of claim 1, wherein the block copolymer is in a solid state during step (b).

25. The method of claim 1, wherein the macrocyclic oligoester comprises at least one monomeric unit selected from the group consisting of butylene terephthalate, ethylene terephthalate, and propylene terephthalate.

26. The method of claim 1, wherein the mixture comprises a dihydroxyl-functionalized polymer.

27. The method of claim 26, wherein the dihydroxyl-functionalized polymer comprises at least one member selected from the group consisting of a dihydroxyl-functionalized poly(alkylene terephthalate), a dihydroxyl-functionalized poly(ethylene terephthalate), a dihydroxyl-functionalized poly(butylene terephthalate), a dihydroxyl-functionalized poly(propylene terephthalate), a dimer diol, a polyolefin diol, a polycaprolactone diol, a polyperfluoroether diol, and a polysiloxane diol.

28. The method of claim 1, wherein the mixture comprises an oligoether.

29. The method of claim 28, wherein the oligoether comprises at least one member selected from the group consisting of poly(ethylene ether) glycol, poly(propylene ether) glycol, poly(tetramethylene ether) glycol, and poly(tetramethylene oxide).

30. The method of claim 1, wherein the mixture comprises a dimerized fatty acid.

31. The method of claim 30, wherein the dimerized fatty acid comprises a dimerization product of at least one member selected from the group consisting of oleic acid, linoleic acid, palmitoleic acid, elaidic acid, eucric acid, sunflower oil, soybean oil, olive oil, rapeseed oil, cottonseed oil, and tall oil.

32. The method of claim 1, further comprising the step of:
(c) contacting the block copolymer after step (b) with an ester in the presence of a transesterification catalyst at an elevated temperature, thereby producing a copolyester comprising structural units from component (i) of the mixture, component (ii) of the mixture, and the ester, wherein the ester comprises at least one structural unit of formula:

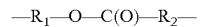

wherein each of $R_1$ and $R_2$ is independently a divalent organic moiety.

33. The method of claim 32, wherein the block copolymer comprises a soft block comprising units contributed by component (ii) of the mixture, and the block copolymer comprises a hard block comprising units contributed by component (i) of the mixture and the ester of step (c).

34. The method of claim 33, wherein the hard block comprises randomized units contributed by component (i) of the mixture and the ester of step (c).

35. The method of claim 32, wherein the ester comprises a cyclic ester.

36. The method of claim 35, wherein the cyclic ester is a lactone.

37. The method of claim 36, wherein the lactone is caprolactone.

38. The method of claim 32, wherein the ester comprises an aliphatic or aromatic polyester.

39. The method of claim 32, wherein step (c) is conducted at a temperature within a range from about 100° C. to about 300° C.

40. The method of claim 32, wherein $R_1$ is not —O-A'- if $R_2$ is —B'—C(O)—, where A' is an alkylene, a cycloalkylene, or a mono- or polyoxyalkylene group and B' is a divalent aromatic or alicyclic group.

41. A block copolymer comprising:
(a) a first block unit comprising, within its polymeric backbone, at least one structural unit of formula:

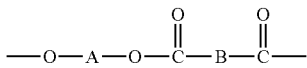

wherein A is an alkylene, or a cycloalkylene or a mono- or polyoxyalkylene group, and B is a divalent aromatic or alicyclic group; and
at least one structural unit of formula:

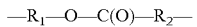

wherein each of $R_1$ and $R_2$ is independently a divalent organic moiety, wherein $R_1$ is not —O-A'- if $R_2$ is —B'—C(O)—, where A' is an alkylene, a cycloalkylene, or a mono- or polyoxyalkylene group and B' is a divalent aromatic or alicyclic group; and
(b) a second block unit comprising, within its polymeric backbone, at least one structural unit of formula:

-D- wherein D is an alkylene, or a cycloalkylene or a mono- or polyoxyalkylene group, and wherein one or more of the carbon atoms in D may be replaced with an oxygen atom, a nitrogen atom, or a sulfur atom, wherein D comprises at least one member selected from the group consisting of a polyalkylene ether, a polyethylene ether, a polypropylene ether, a polymethylene ether, a polyolefin, a polycaprolactone, a polyperfluoroether, a dimer diol, and a polysiloxane diol.

42. The block copolymer of claim 41, wherein the first block unit of the block copolymer comprises a random configuration of the structural units of formula

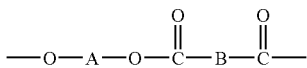

and formula

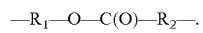

43. The block copolymer of claim 41, having molecular weight of at least about 150,000.

44. The block copolymer of claim 41, having molecular weight of at least about 200,000.

45. The block copolymer of claim 41, wherein the weight ratio of second block units to first block units is at least about 10:90.

46. The block copolymer of claim 41, wherein the weight ratio of second block units to first block units is at least about 25:75.

47. The block copolymer of claim 41, wherein the block copolymer is inherently dissipative.

48. A blend comprising:
(a) a block copolymer comprising:
(i) a first block unit comprising, within its polymeric backbone, at least one structural unit of formula:

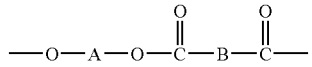

wherein A is an alkylene, or a cycloalkylene or a mono- or polyoxyalkylene group, and B is a divalent aromatic or alicyclic group; and
(ii) a second block unit comprising, within its polymeric backbone, at least one structural unit of formula:

-D- wherein D is an alkylene, or a cycloalkylene or a mono- or polyoxyalkylene group, one or more of the carbon atoms in D may be replaced with an oxygen atom, a nitrogen atom, or a sulfur atom, wherein D comprises at least one member selected from the group consisting of a polyalkylene ether, a polyethylene ether, a polypropylene ether, a polymethylene ether, a polyolefin, a polycaprolactone, a polyperfluoroether, a dimer diol, and a polysiloxane diol; and
(b) at least one of a hydroxyl-functionalized polymer, an oligoether, and a dimerized fatty acid.

49. The blend of claim 48 wherein component (b) of the blend comprises polyethylene glycol.

* * * * *